(12) United States Patent
Charmot et al.

(10) Patent No.: US 6,465,562 B1
(45) Date of Patent: Oct. 15, 2002

(54) LATEX BINDER FOR COATING COMPOSITION

(75) Inventors: Dominique Charmot, Los Gatos, CA (US); William Bett, Paris; Vincent Granier, Vincennes, both of (FR)

(73) Assignee: Rhodia Chimie, Boulogne Billancourt Cedex (FR)

( * ) Notice: Subject to any disclaimer, the term of this patent is extended or adjusted under 35 U.S.C. 154(b) by 0 days.

(21) Appl. No.: 09/509,976

(22) PCT Filed: Sep. 28, 1998

(86) PCT No.: PCT/FR98/02071

§ 371 (c)(1),
(2), (4) Date: Jun. 21, 2000

(87) PCT Pub. No.: WO99/18164

PCT Pub. Date: Apr. 15, 1999

(30) Foreign Application Priority Data

Oct. 6, 1997 (FR) .............................................. 97 12429

(51) Int. Cl.[7] .............................................. C08L 33/02

(52) U.S. Cl. ........................ 524/501; 523/402; 523/406; 523/408; 523/409; 523/410; 523/412; 524/517

(58) Field of Search .................................. 523/408, 402, 523/406, 409, 410, 412; 524/501, 517

(56) References Cited

U.S. PATENT DOCUMENTS

| 4,857,566 A | * | 8/1989 | Helbling | 523/409 |
| 5,017,632 A | * | 5/1991 | Bredow et al. | 523/400 |
| 5,877,239 A | * | 3/1999 | Craun et al. | 523/403 |

FOREIGN PATENT DOCUMENTS

| JP | 05105799 | * | 4/1993 |

* cited by examiner

*Primary Examiner*—Judy M. Reddick

(57) ABSTRACT

The invention concerns a novel binder for aqueous coating composition, comprising: at least a latex (A) prepared from ethylenically unsaturated monomers and having a carboxylic acid function, and at least a latex (B) prepared from ethylenically unsaturated monomers and havinging an epoxide function, and for which said latex particle size is not more than 50 nm.

10 Claims, No Drawings

LATEX BINDER FOR COATING COMPOSITION

This application is an application under 35 U.S.C. Section 371 of International Application Number PCT/FR98/02071 filed on Sep. 28, 1998.

The present invention relates to aqueous coating compositions used, for example, as water-based paints, and which crosslink at room temperature.

Coating compositions which crosslink under ambient conditions are known in the prior art. The best known compositions are based on reactions between epoxides and carboxylic acids, between isocyanates and water, between polyaziridine and carboxylic acids, and between activated methylene and acrylic acid.

Compositions involving the reaction between an epoxide and a carboxylic acid comprise a binder which is either the mixture of a latex containing a carboxylic acid function and a latex containing an epoxide function, or a latex containing both of these functions at the same time, such as, for example, the one described in EP 653,469.

It has been observed that these binders are highly unstable on storage: the crosslinking reactions between the two acid and epoxide functions take place during this storage, to the extent that the reactive function of the binder does not take place during use of the binder as a coating. This creates a film with poor properties, in particular one with poor chemical resistance.

One aim of the present invention is thus to propose coating compositions based on a mixture of latex containing carboxylic acid functions and epoxy functions, which behave satisfactorily on storage and have good reactivity at the time of use.

With these aims, the invention relates to a binder for a coating composition, comprising:
- at least one latex (A) prepared from ethylenically unsaturated monomers and containing a carboxylic acid function, and
- at least one latex (B) prepared from ethylenically unsaturated monomers and containing an epoxide function, and for which the particle size of the said latices is not more than 50 nm.

The invention also relates to a coating composition based on a binder as defined above.

Other details and advantages of the invention will emerge even more clearly on reading the description and the examples.

The invention thus relates, firstly, to a binder for a coating composition, comprising:
- at least one latex (A) prepared from ethylenically unsaturated monomers and containing a carboxylic acid function, and
- at least one latex (B) prepared from ethylenically unsaturated monomers and containing an epoxide function, and for which the particle size of the said latices is not more than 50 nm.

The term latex is understood to refer to an aqueous dispersion of polymer particles.

According to the invention, the binder is a mixture of latices prepared from ethylenically unsaturated monomers. This mixture comprises at least one latex containing a carboxylic acid function and at least one latex containing an epoxide function. The essential characteristic of the binder according to the invention is that the particles of these latices contain carboxylic acid and epoxide functions and are not more than 50 nm in size, preferably between 20 and 40 nm in size. The term size is understood to refer to the particle diameter. The particle size distribution of the particles in each latex is relatively unimportant. On the other hand, it is essential for all of the particles in the latex to be not more than 50 nm in size: the coarsest latex particles are thus not more than 50 nm in size. The particle size is measured by transmission electron microscopy (TEM).

Preferably, the molecular mass $\overline{M}_n$ of the polymer in the latex (A), which contains a carboxylic acid function, is between 40,000 and 500,000 g/mol, preferably between 100,000 and 400,000 g/mol.

For the latex (B), which contains an epoxide function, the molecular mass $\overline{M}n$ is preferably between 4000 and 50,000 g/mol, even more preferably between 20,000 and 40,000 g/mol.

These molecular masses are measured by gel chromatography (GPC).

In general, the minimum film-forming temperature (MFFT) of the polymer in the latex (A), which contains a carboxylic acid function, is between 0 and 15° C., preferably between 6 and 12° C., and that of the polymer in the latex (B), which contains an epoxide function, is between 30 and 50° C., preferably between 35 and 45° C.

In general, the latex (A), which contains a carboxylic acid function, and the latex (B), which contains an epoxide function, are present in the binder in an "equimolar" ratio, i.e. the latices are introduced in amounts such that the mixture contains one carboxylic acid function per epoxide function.

It has been observed that the best results are obtained when the epoxide groups in the latex (B) are at the surface of the particles in the said latex. It is thus preferable to use a latex (B) in which most of the epoxide functions are at the surface of the polymer particles.

The binder according to the invention is obtained by simple mixing of the latices (A) and (B).

The latices (A) and (B) are generally derived from the polymerization of ethylenically unsaturated monomers such as:
- (meth)acrylic esters in which the alkyl group contains from 1 to 20 carbon atoms, such as methyl acrylate, methyl methacrylate, ethyl acrylate, ethyl methacrylate, isopropyl acrylate, butyl acrylate, butyl methacrylate, 2-ethylhexyl methacrylate, decyl acrylate, lauryl methacrylate or benzyl acrylate,
- vinylaromatics such as styrene, vinyltoluene or α-methylstyrene.

The latex (A) is derived from the polymerization of at least one of the said ethylenically unsaturated monomers and from at least one monomer carrying the carboxylic acid function. In general, the carboxylic acid function originates from a mono- or polycarboxylic acid containing one polymerizable bond per molecule. In general, such acids contain 3 to 24 carbon atoms and one or two carboxylic acid groups per molecule. They may be, for example:
- acrylic, methacrylic, maleic, fumaric, itaconic, ethacrylic, crotonic or citraconic acid,
- semi-esters of dicarboxylic acids in which the esterified alcohol group comprises 1 to 20 carbon atoms, such as: methyl hydrogen fumarate, benzyl hydrogen maleate, octyl hydrogen itaconate or dodecyl hydrogen citraconate, and the like.

The preferred carboxylic acids are acrylic acid and methacrylic acid.

The monomers carrying the carboxylic acid function generally represent at least 15% by weight of the sum of the monomers forming the polymer in the latex (A).

The latex (B) is derived from the polymerization of at least one of the above ethylenically unsaturated monomers and of at least one monomer carrying the epoxide function. Preferably, the epoxide function originates from a glycidyl (meth)acrylate monomer. Such a monomer can be obtained commercially. It can be derived from the esterification reaction of acrylic acid or methacrylic acid with glycidol or epichlorohydrin, followed by a adehydrohalogenation.

The monomers carrying the epoxide function generally represent 10 to 40% by weight of the sum of the monomers forming the polymer in the latex (B), preferably 20 to 30%. These latices (A) and (B), which have a particle size of not more than 50 nm, can be obtained by the standard polymerization processes such as, for example, the one described in patent application EP 644,205, and in particular Example 4 of that application. This involves polymerization of monomers emulsified in water. Preferably, these processes are carried out continuously. According to this Example 4, the latex is obtained by preparing an aqueous solution comprising the surfactant and the polymerization initiator, into which the monomer mixture is introduced portionwise and continuously.

The surfactants used to emulsify the monomers are especially anionic surfactants.

As examples of anionic surfactants which may be used, mention may be made of linear sodium and potassium alkyl sulphates such as sodium lauryl sulphate, sodium alkylaryl sulphates, ethoxylated alkylphenol sulphates and sulphonates, ethoxylated fatty alcohol sulphates and sulphonates, and sulphosuccinates.

The molecular masses of the latices (A) and (B) are controlled by the amount of transfer agent introduced during the polymerization.

The amounts of surfactants used in the emulsion polymerization process range between 0.01 and 10% by weight in general, and preferably between 0.2 and 5% by weight, relative to the total weight of the monomers and of water. It is possible to orient the polymerization of the latex (B) such that most of the epoxide functions are at the surface of the particles by carrying out a continuous polymerization process—rather than a batchwise process—according to the process defined in patent application EP 644,205, and in particular Example 4 of that application.

One characteristic of the binder according to the invention is that it leads to coatings with only one glass transition temperature (Tg). This proves that there has been good interaction between the acid and epoxide polymer chains and that the coating obtained is homogeneous.

The invention also relates to a coating composition containing common adjuvants and the binder according to the invention.

In addition to the binder according to the invention, the composition can contain any binder used in coating compositions of this type. Mention may be made of acrylate and styrene/acrylate latices, acetate copolymers, aqueous polyurethane, polyester, epoxy and alkyd dispersions, and polyurethane, epoxy and alkyd resins. These binders can replace up to 80% by weight, preferably up to 50% by weight, of the binder according to the invention in the aqueous coating compositions.

When they are intended for use as binders in paints, the aqueous coating compositions according to the present invention can be applied to a large number of substrates to form films and coatings which crosslink and give compositions that thermoset at room temperature or above. The preferred crosslinking temperatures range between 10 and 100° C.

The compositions can contain as common adjuvants: thickeners, antifoaming agents, glycols, coalescence agents, pigments, base activators. These adjuvants usually represent less than 5% by weight of solids present in the final aqueous composition.

The compositions can be applied to any type of substrate: wood, metal, concrete, plastic, glass and the like.

The examples which follow give a more detailed description of the invention. Except where otherwise mentioned, the parts and percentages are given on a weight basis.

EXAMPLES

Example 1

Synthesis of a Latex Less Than 50 n in Size Containing a Carboxylic Acid Function 2460 g of purified water and 50.26 g of sodium lauryl sulphate are introduced into a 5-litre jacketed reactor fitted with a mechanical stirrer, a condenser and a system for placing an inert atmosphere ($N_2$) above the reaction medium. The temperature is brought to 85° C.±1° C.

2.38 g of ammonium peroxodisulphate are added to initiate the reaction.

Next, over 2 hours, the monomer mixture of the composition below is introduced:

| | |
|---|---|
| styrene | 250 g |
| butyl acrylate | 840 g |
| methacrylic acid | 210 g |

To compensate for the high exothermicity and the increase in viscosity, 700 g of purified water are added in parallel with the supply of monomers during the second hour.

When the addition of the monomers and the water is complete, 2.9 g of tert-butyl peroxybenzoate are introduced. The reactor is then supplied for 1 hour with a reducing solution of 1.4 g of erythorbic acid in 50 g of water, while always maintaining the temperature at 85° C.

The product is finally cooled to room temperature.

The latex obtained has a solids content of 30% by weight. The particle size is 30 nm, measured by transmission electron microscopy (TEM).

The MFFT is 10° C. and the, calculated Tg is −4° C.

The molecular mass $\overline{M}_n$ is 200,000 g/mol.

Example 2

Synthesis of a Latex Less Than 50 nm in Size Containing an Epoxide Function 2560 g of purified water and 48.5 g of sodium lauryl sulphate are introduced into a 5-litre jacketed reactor fitted with a mechanical stirrer, a condenser and a system for placing an inert atmosphere ($N_2$) above the reaction medium. The temperature is brought to 85° C.±1° C.

2.3 g of ammonium peroxodisulphate are added to initiate the reaction.

Next, the monomer mixture of the composition below is introduced over 2 hours:

| | |
|---|---|
| styrene | 661.5 g |
| butyl acrylate | 351 g |
| glycidyl methacrylate | 337.5 g |
| 3-methyl mercaptopropionate | 6.75 g |

To compensate for the high exothermicity, 756 g of purified water are added in parallel with the supply of monomers over the second hour.

When the addition of the monomers and the water is complete, 2.9 g of tert-butyl peroxybenzoate are introduced. The reactor is then supplied for 1 hour with a reducing solution of 1.4 g of erythorbic acid in 50 g of water, while always maintaining the temperature at 85° C.

The product is finally cooled to room temperature.

The latex obtained has a solids content of 30% by weight. The particle size is between 35 and 40 nm, measured by TEM.

The MFFT is 39° C.

The average molecular mass $\overline{M}n$ is 21,000 g/mol.

Example 3

Synthesis of a Latex Greater Than 50 nm in Size Containing a Carboxylic Acid Function A latex containing an acid function is prepared by emulsion polymerization according to a standard process, by reacting, at 80° C., the following monomer mixture:

| | |
|---|---|
| styrene | 26.5% by weight of the mixture |
| butyl acrylate | 63.5% |
| acrylic acid | 5% |
| methacrylic acid | 5% |

The latex containing an acid function obtained has a Tg of 2° C., measured by differential enthalpy analysis (DSC: "differential scanning calorimetry").

The particle size is 72 nm, measured by quasi-elastic light scattering EQELS).

Example 4

Synthesis of a Latex Greater Than 50 nm in Size Containing an Epoxide Function A latex containing an epoxide function is prepared by emulsion polymerization according to a standard process, by reacting, at 80° C., the following monomer mixture:

| | |
|---|---|
| styrene | 48.5% by weight of the mixture |
| butyl acrylate | 26% |
| glycidyl methacrylate | 25% |
| 3-methyl mercaptopropionate | 0.5% |

The latex containing an acid function obtained has a Tg of 40° C., measured by DSC.

The particle size is 72 nm, measured by QELS.

Example 5

Mixtures of Epoxy and Acid Latices 5.1. Degree of Swelling of the Films

Two coating compositions are prepared:
a composition 1 according to the prior art, by mixing:
  an acid latex according to Example 3, and
  an epoxy latex according to Example 4.
a composition 2 according to the invention, mixing the two latices obtained according to Examples 1 and 2.

These coating compositions are prepared according to the following formulation:
50% acid latex,
50% epoxy latex.

This composition is used to coat an earthenware tile. The degree of swelling is measured on the film obtained, according to the following procedure.

A piece of the film obtained is weighed (mass M1) and then immersed in methyl ethyl ketone for 24 hours. After immersion for 24 hours, the sample is removed from the solvent, immediately weighed (mass M2) and then dried in an oven. After drying for 1 hour at 105° C., the sample is weighed (mass M3). The degree of swelling is given by the formula: (M2–M3)×100/M3.

The results are given in Table 1:

TABLE 1

| | Degree of swelling | |
|---|---|---|
| Composition | drying for 7 days at 23° C. and 55% relative humidity | drying for 7 days at 55° C. |
| 1 according to the prior art | 1500% | 1100% |
| 2 according to the invention | 1300% | 360% |

Composition 2 according to the invention is more reactive than composition 1: it leads to a resistant film which swells little in the presence of solvent.

5.2. Measurement of the Homogeneity of Varnishes

The glass transition temperatures (Tg) of films obtained by depositing the above coating compositions 1 and 2 on an earthenware tile and after drying for 7 days at 23° C. and at 55% relative humidity are measured.

The Tg is measured. by dynamic mechanical analysis (DMA): this is the temperature corresponding to the maximum of the loss modulus E".

For composition 1, two Tg values of 3 and 38° C. are measured, which proves that there has been little interaction between the two latices in the coating.

For composition 2, only one Tg value of 25° C. is measured, which proves that there has been good interaction of the acid and epoxide polymer chains in the coating.

5.3 Properties of the Varnishes

The coating compositions 1 and 2 are placed on QD361 steel plates to a dry thickness of 40 μm. The films are dried for 7 days at 23° C. and at 55% relative humidity.

The properties of hardness and of resistance to solvents were measured.

The hardness is the Persoz hardness measured according to standard NF T 30-016.

The resistance to solvents is evaluated according to the following procedure: the plate is rubbed with a pad of cotton wool soaked with methyl ethyl ketone. The number of to-and-fro rubbing actions of the pad required to remove the varnish completely from at least one point on the plate are counted.

The results are collated in Table 2:

TABLE 2

| Composition 1 according to the prior art | Composition 2 according to the invention |
| --- | --- |
| Persoz hardness | |
| 62 | 214 |
| Resistance to solvents | |
| 45 | 174 |

The chemical resistance of the coating obtained from the composition according to the invention was also evaluated.

The chemical resistance is evaluated according to the test which consists in placing 2 ml of test product onto the coating and then placing a watch-glass over this to prevent the liquid from evaporating. The liquid is left in contact with the coating for 2 hours. After 2 hours, the liquid is removed and the visual appearance of the film is graded (0=very poor: varnish deteriorated; 5=good: no mark left on the varnish by the liquid).

The results are collated in Table 3.

TABLE 3

| Test product | Appearance of the film |
| --- | --- |
| $CH_3COOH$ | 3 |
| $H_2SO_4$ | 5 |
| $NH_4OH$ | 4 |
| EtOH | 3 |

What is claimed is:

1. A binder for a coating composition, comprising:

at least one latex (A) comprising a polymer prepared from ethylenically unsaturated monomers and containing a carboxylic acid function, and at least one latex (B) comprising a polymer prepared from ethylenically unsaturated monomers and containing an epoxide function, and wherein the particle size of said latices is not more than 50 nm.

2. A binder according to claim 1, wherein the polymer of the latex (A) containing a carboxylic acid function has a molecular mass $\overline{M}_n$ between 40,000 and 500,000 g/mol.

3. A binder according to claim 1, wherein the polymer of the latex (B) containing an epoxide function has a molecular mass $\overline{M}_n$ between 4000 and 50,000 g/mol.

4. A binder according to claim 1, wherein the Minimum Film Forming Temperature (MFFT) of the polymer in the latex (A) containing a carboxylic acid function is between 0 and 15° C.

5. A binder according to claim 1, wherein the minimum film forming temperature of the polymer in the latex (B) containing an epoxide function is between 30 and 50° C.

6. A binder according to claim 1, wherein the latex (A) containing a carboxylic acid function and the latex (B) containing an epoxide function are present in an equimolar ratio.

7. A binder according to claim 1, wherein, for the latex (B) containing an epoxide function, the epoxide groups are at the surface of the particles in said latex.

8. A binder according to claim 1, wherein the latex (B) containing an epoxide function is prepared by polymerization of monomers containing ethylenic unsaturation and of glycidyl (meth)acrylate.

9. A coating composition comprising a binder as defined in claim 1, said coating having only one glass transition temperature (Tg).

10. Coating composition containing common adjuvants and a binder as defined in claim 1.

* * * * *